April 16, 1957        G. C. MAGANN, JR        2,788,916
FLUID VOLUME AND VALUE INDICATING AND CONTROLLING
DEVICE FOR USE WITH FLUID DISPENSING PUMPS
Filed Nov. 24, 1954                          2 Sheets-Sheet 2
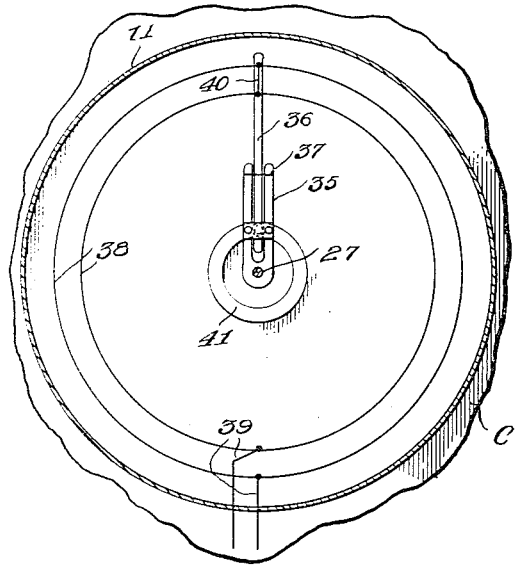
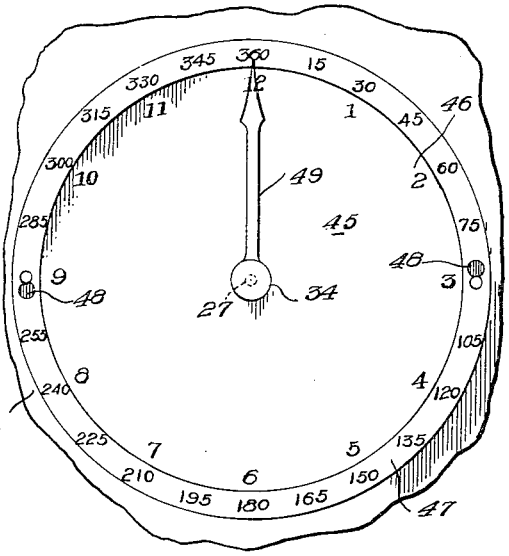
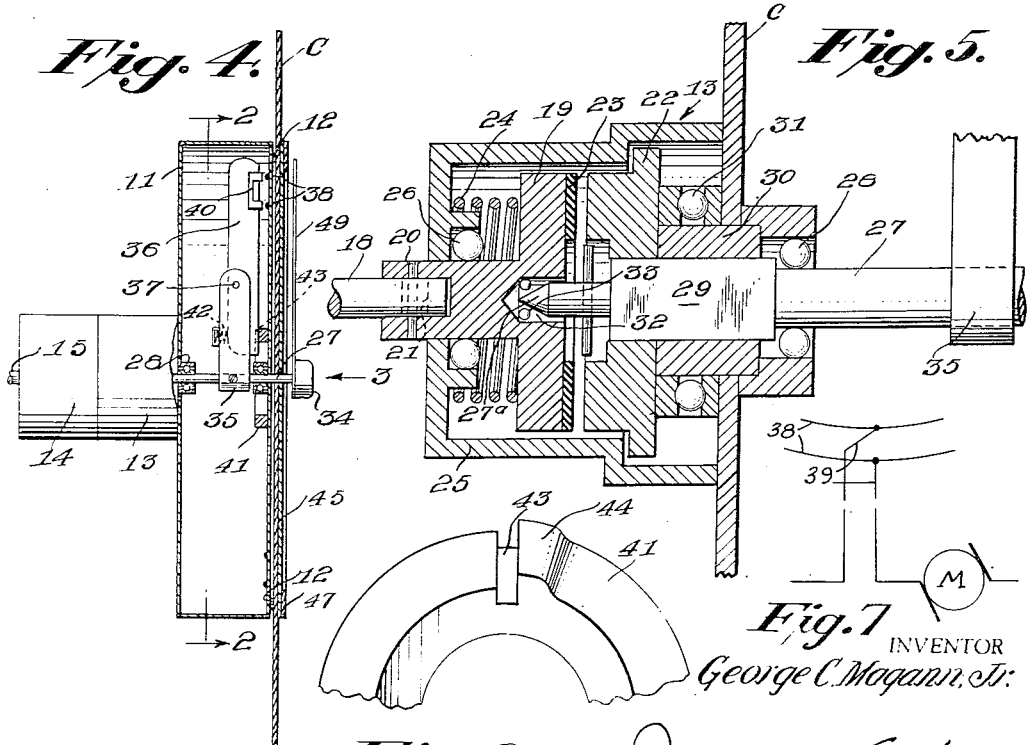

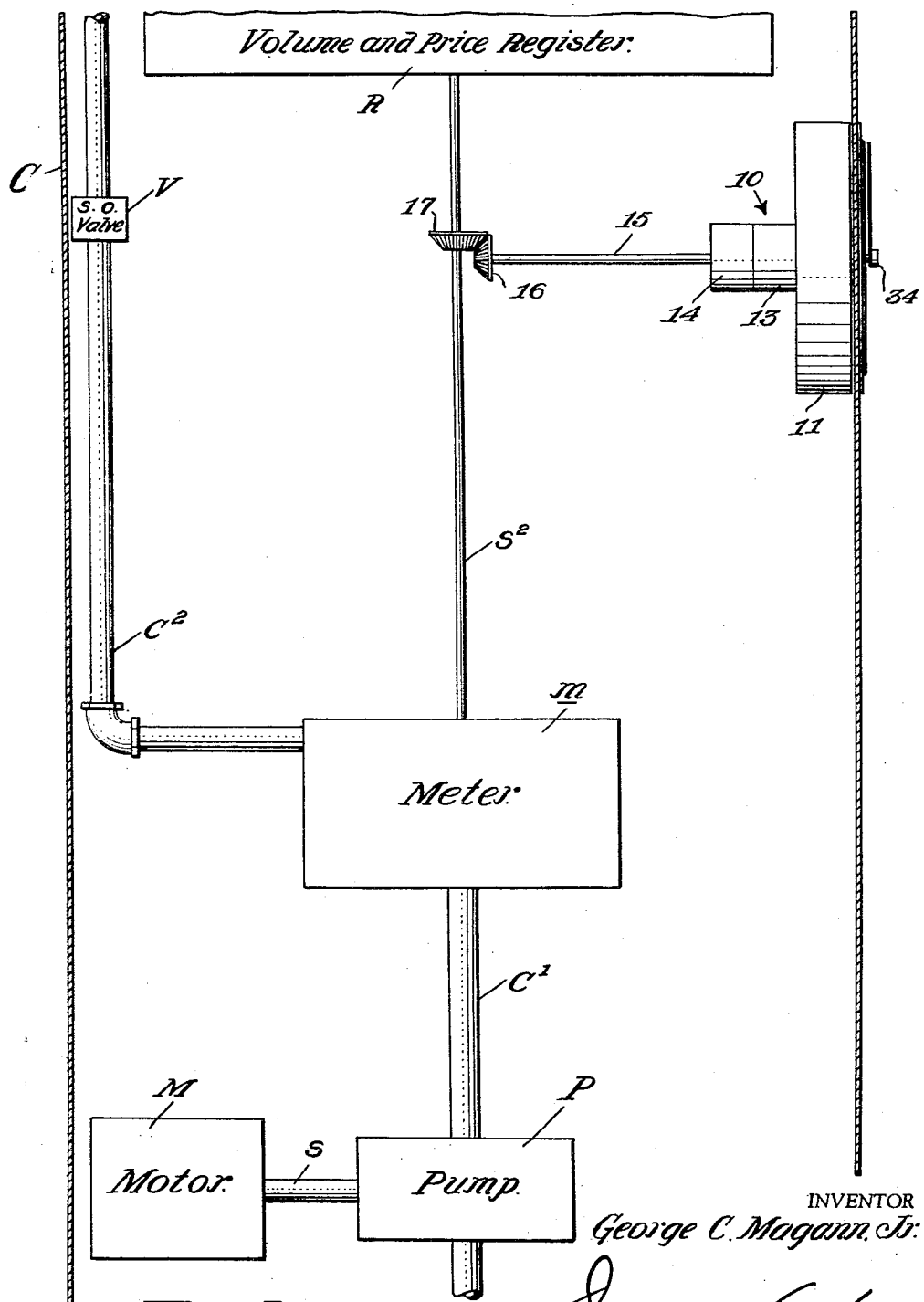

United States Patent Office 2,788,916
Patented Apr. 16, 1957

2,788,916

FLUID VOLUME AND VALUE INDICATING AND CONTROLLING DEVICE FOR USE WITH FLUID DISPENSING PUMPS

George C. Magann, Jr., Odenton, Md.

Application November 24, 1954, Serial No. 470,968

7 Claims. (Cl. 222—17)

This invention relates to a fluid volume and value indicating and controlling device for use with fluid dispensing pumps.

Fluid dispensing pumps, such as the well known gasoline dispensing pumps, are provided with computers and registers operatively associated therewith for indicating quantity and cost of gasoline dispensed. Such pumps as now generally in use are driven by an electric motor which is controlled by a normally open switch, which switch is closed upon releasing the hose for discharge of the gasoline.

Most patrons request a certain number of gallons of gasoline or that their tanks be filled. It is a relatively simple matter for a gasoline station attendant to deliver a given number of gallons of gasoline or to fill the tank, and an attendant is also capable of delivering a requested dollars' or cents' worth of gasoline with fair accuracy, but in either case he is required to remain at the pump and keep his eyes fixed on the registers, since the flow of gasoline can be checked only by replacing the hose or closing the valve in the nozzle.

There are, however, many occasions when a patron requests the delivery of a value amount of gasoline, as, e. g., one dollar's worth, which in all probability will be in fractions of gallons. Not only does it require an attendant's constant attention to the pump register, but he is required to hold the delivery hose while the requested amount of gasoline is being dispensed.

It is a primary object of this invention to provide a combined volume and value indicator, as an attachment to standard gasoline pump registers, whereby in the use of same any required volume or money's worth of gasoline can be delivered without an attendant remaining with the pump while the gasoline is being delivered.

A further object of the invention is to provide an indicator which is driven by the usual computing and registering shaft, and which is in electric circuit with the driving and controlling means of the pump, and includes in its construction a switch automatically operable upon the required volume or money's worth of gasoline being dispensed.

Other objects and advantages of the invention will become apparent in the course of the following detailed description, taken in connection with the accompanying drawings, wherein:

Figure 1 is a diagrammatic vertical sectional and elevational view of a standard gasoline dispensing pump and showing the present invention operatively associated therewith.

Fig. 2 is a vertical sectional view in the plane of line 2—2 on Fig. 4 and showing in particular the improved indicator from the inner side thereof.

Fig. 3 is a fragmentary elevational view showing the indicator as observed exteriorly of the pump as in the direction of arrow 3 on Fig. 4.

Fig. 4 is a diametrical vertical sectional view of the indicator.

Fig. 5 is an axial vertical sectional view of a clutch device involved in the invention.

Fig. 6 is a fragmental perspective view of a circuit controlling ring as observed from the inner side thereof.

Fig. 7 is a diagrammatic view showing connection between electric conductors and a motor-operating circuit.

Referring now in detail to the drawings and first to Fig. 1 thereof, the casing of a standard gasoline dispensing pump is fragmentally indicated at C. Suitably supported within the casing is a pump P which is driven by an electric motor M through a shaft S.

Disposed above the pump is a meter $m$ which is in communication with the pump through a conduit C', and a second conduit $C^2$ leads from the meter $m$ to a point for connection with the delivery hose. The conduit $C^2$ is preferably provided with a solenoid operated valve V, and a vertical shaft $S^2$ extends from the meter $m$ to the computer and register R.

The improved indicator according to the present invention is indicated at 10 in Fig. 1, and same is illustrated in detail in Figs. 2 to 6. The improved indicator 10 comprises a sealed housing 11 which is disposed within the casing C and suitably secured to a side wall thereof, as indicated at 12 in Fig. 4.

Supported by the housing 11 and disposed immediately inwardly thereof is a clutch and a change gear unit 13 and 14, respectively. The gear unit 14 is operatively connected to the pump register shaft $S^2$ by means of a shaft 15 and intermeshing bevel gears 16 and 17.

The gear unit drives a clutch shaft 18, which is connected to a clutch drive member 19 through a pin and slot connection 20 and 21, and the purpose of the gear unit is to vary the relative speed of rotation of the shafts 15 and 18, as may be required with different pumps to which the present invention may be attached.

The clutch 13 further comprises a friction driven member 22 which is normally engaged by the clutch plate 23 on member 19 and which member 19 is yieldably engaged with member 22 by a spring 24.

The clutch members 19, 22 are supported within a housing 25 which is suitably connected to the casing C, and the clutch member 19 has a ball bearing assembly 26 associated therewith.

A pointer operating shaft 27 is rotatably supported within a ball bearing assembly 28 and same includes a rectangular section 29 which is axially slidable within clutch member 22 and a collar 30 juxtaposed to the member 22, and a thrust ball bearing assembly 31 is disposed between the clutch member 22 and the casing C.

The clutch member 19 is provided with a central recess 32 which receives the conical end 27a of shaft 27 and which end is engaged with a ball bearing assembly 33. The shaft 27 extends through the housing 11 as well as the adjacent wall of casing C and is provided with an operating knob 34 on the outer end thereof. Secured to the shaft 27 within the housing 11 is the lower end of a bracket 35, and an arm 36 is pivotally connected intermediate its ends to the bracket, as at 37.

Suitably supported on the inner face of the outer wall of housing 11 are electric conductors 38 which are in connection with the pump-operating circuit, as is fragmentally indicated at 39, and the outer end of arm 36 is provided with a contact member 40 which bridges the conductors 38 to complete the circuit through the pump motor M and the valve V. The inner end of arm 36 is yieldably urged toward a ring 41 by means of a spring 42 disposed between the arm and the bracket 35, and which ring holds the contact member in engagement with the conductors 38.

The ring 41 which is secured to the outer wall of casing C is provided with a recess 43 and a ridge 44 adjacent thereto. Supported by the outer wall of casing C is a disk 45 adjacent whose periphery is a gallon indicating dial 46, and a price-indicating ring 47 is removably connected to the periphery of the disk 45 as by pin and key-hole slots, indicated at 48. The shaft 27 extends centrally through the disk 45 and is provided with an indicating pointer 49.

The structure as above described operates as follows:

When the arm 36 is in a predetermined inoperative position which may preferably be vertical, as indicated, the lower end thereof is engaged within the recess 43 and the contact member 40 is out of bridging contact with conductors 38, as indicated in Fig. 4, and the circuit through the pump motor M and valve V is broken.

In this position of the arm, the pointer 49 is at zero position. Assume that a customer requests two gallons of gas or sixty cents' worth, the operator will move the pointer clockwise to the indicating position on dial 46 or ring 47, which movement of the pointer is effected by pushing inwardly on the knob 34 to disengage the clutch as in Fig. 5, whereupon the pointer may be freely moved.

In such movement of the pointer the arm 36 is disengaged from recess 43 and moved into engagement with the inner face of ring 41 whereby the circuit is closed. The pump will then operate and the pointer 49 and arm 36 will be moved back to zero position during the delivery of the gas, whereupon the arm 36 will drop into recess 43 and the circuit will be broken and the pump stopped. When the pointer has been set, the attendant need not watch the pump, since the attachment is wholly automatic in its stopping action.

Should it be desired to deliver a larger volume of gasoline than that indicated on the dials, the pointer 49 may be moved through a complete rotation short of the notch 43 with the inner end of the arm 36 resting upon the ridge 44. Such disposition of the arm moves shaft 27 inwardly with a consequent disengagement of the clutch, while the contact member 40 will remain in engagement with conductors 38 for closing the circuit through the pump operating motor M, whereby the gasoline will be delivered in usual fashion.

The price indicating ring 47 may in practice be provided with price designations for gallons and half-gallons, as indicated, or it may indicate smaller gallon fractions, as may be desired.

In view of the fact that the price of gasoline periodically changes, the ring 47 is readily detachable as disclosed, whereby another ring having current price indications thereon may be substituted therefor. In fact, several price-indicating rings may be made available having price designations thereon which differ on the different rings as little as one tenth of a cent per gallon of gasoline.

While I have disclosed my invention in accordance with a single specific structural embodiment thereof, such is to be considered as illustrative only, and not restrictive, the scope of the invention being defined in the subjoined claims.

What I claim and desire to secure by U. S. Letters Patent is:

1. An attachment for a fluid-dispensing apparatus including a casing, an electric motor, a pump, and a meter disposed within the casing and a register operative by a shaft rotated by the meter; said attachment comprising a cylindrical housing securable to the inner face of a wall of said casing, a fluid-indicating dial securable to the outer face of said wall, a shaft extending through said housing and said dial, one end of said last shaft being drivable by said first shaft, a pointer secured to the other end of said second shaft for rotation about said dial, a pair of concentric conductors in said housing for connection with the circuit to said motor, and means disposed within said housing and rotatable with said shaft for establishing connection between said conductors for completing the circuit through said motor and fixed means in said housing for interrupting such circuit upon movement of said pointer through a predetermined angular range in opposition to manual movement thereof to a predetermined fluid volume or value indication on said dial.

2. The structure according to claim 1, wherein said second means comprises a ring secured to the inner face of the outer wall of said housing, the inner face of said ring having a recess therein, said first means comprising an arm disposed within said housing movable with said second shaft and having a pivotal connection therewith for swinging movement toward and from said conductors, spring means biasing said arm toward said conductors, a contact member on said arm engageable with said conductors, and said arm being of a width to enter said recess upon a predetermined range of rotation of said second shaft with a pivotal movement of the arm and a resulting movement of the contact member out of engagement with said conductors.

3. The structure according to claim 2, wherein the pivotal connection of said arm with said second shaft is effected by a bracket rigidly secured to the second shaft, one end portion of the arm extending into said bracket and pivotally connected thereto, and said spring means comprising a coil spring supported by said bracket and bearing on said arm below the said pivotal connection.

4. The structure according to claim 2, together with an axially releasable clutch in said second shaft for manual rotation of said pointer without rotation of said first shaft.

5. The structure according to claim 4, together with a change gear unit in said second shaft adjacent said clutch.

6. The structure according to claim 4, together with a projection on said ring for engagement by the inner end of said arm for releasing said clutch and maintaining said contact member in engagement with said conductors.

7. The structure according to claim 1, wherein said dial comprises a disk fixed to said casing and having fluid gallon designations thereon adjacent the periphery thereof, and a ring removably engaged with said disk and having fluid value designations thereon.

References Cited in the file of this patent

UNITED STATES PATENTS

| | | |
|---|---|---|
| 2,180,821 | Grinnel | Nov. 21, 1939 |
| 2,414,030 | Eichner | Jan. 7, 1947 |
| 2,617,558 | Ross | Nov. 11, 1952 |